(12) United States Patent
Lim

(10) Patent No.: US 8,992,100 B2
(45) Date of Patent: Mar. 31, 2015

(54) BIDIRECTIONAL OPTICAL TRANSMISSION AND RECEIVING DEVICE

(75) Inventor: Kwon-Seob Lim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 215 days.

(21) Appl. No.: 13/639,634

(22) PCT Filed: Apr. 7, 2011

(86) PCT No.: PCT/KR2011/002441
§ 371 (c)(1),
(2), (4) Date: Oct. 5, 2012

(87) PCT Pub. No.: WO2011/126317
PCT Pub. Date: Oct. 13, 2011

(65) Prior Publication Data
US 2013/0034357 A1    Feb. 7, 2013

(30) Foreign Application Priority Data

Apr. 7, 2010 (KR) .................. 10-2010-0031830
Mar. 24, 2011 (KR) .................. 10-2011-0026383

(51) Int. Cl.
*G02B 6/36* (2006.01)
*G02B 6/42* (2006.01)

(52) U.S. Cl.
CPC ............ *G02B 6/4201* (2013.01); *G02B 6/4263* (2013.01); *G02B 6/4257* (2013.01); *G02B 6/4277* (2013.01); *G02B 6/4246* (2013.01)
USPC .............................................. 385/92; 385/88

(58) Field of Classification Search
CPC .. G02B 6/4245; G02B 6/4255; G02B 6/4257; G02B 6/4259; G02B 6/426; G02B 6/4261; G02B 6/4263; G02B 6/4277; G02B 6/4278
See application file for complete search history.

(56) References Cited

U.S. PATENT DOCUMENTS

| | | | |
|---|---|---|---|
| 7,093,988 B2 * | 8/2006 | Tsumori | 385/93 |
| 7,309,172 B2 | 12/2007 | Okada | |
| 7,991,290 B2 * | 8/2011 | Tanaka et al. | 398/86 |
| 8,005,367 B2 * | 8/2011 | Nakanishi et al. | 398/138 |
| 8,265,486 B2 * | 9/2012 | Lim et al. | 398/135 |

(Continued)

FOREIGN PATENT DOCUMENTS

| | | |
|---|---|---|
| JP | 54-35692 | 3/1979 |
| JP | 08-23121 | 1/1996 |

(Continued)

*Primary Examiner* — Rhonda Peace
(74) *Attorney, Agent, or Firm* — Rabin & Berdo, P.C.

(57) ABSTRACT

There is provided a bi-directional optical transmitting and receiving apparatus. The bi-directional optical transmitting and receiving apparatus includes: a package having a cavity and allowing a plurality of lead wires to pass therethrough; a platform mounted on the package and including a through hole formed above the cavity and having sloped surfaces; a reception unit mounted within the cavity and generating an electrical signal corresponding to input light made incident to the cavity through the through hole and outputting the generated electrical signal to at least one of the plurality of lead wires; a transmission unit mounted on the platform and generating output light according to an electrical signal transmitted through at least one of the plurality of lead wires; and a wavelength division multiplexing (WDM) filter mounted on the platform to transfer the output light toward an optical fiber and the input light toward the through hole.

19 Claims, 9 Drawing Sheets

(56) References Cited

U.S. PATENT DOCUMENTS

| | | |
|---|---|---|
| 8,573,863 B2 * | 11/2013 | Sato .................. 385/93 |
| 2004/0071413 A1 * | 4/2004 | Tsumori ................ 385/93 |
| 2006/0013541 A1 * | 1/2006 | Plickert et al. ........... 385/89 |
| 2006/0269197 A1 | 11/2006 | Uno et al. |
| 2007/0047880 A1 | 3/2007 | Okada |
| 2007/0146881 A1 * | 6/2007 | Tanaka et al. ............ 359/487 |
| 2009/0129783 A1 | 5/2009 | Ori et al. |
| 2009/0269067 A1 | 10/2009 | Kihara et al. |
| 2010/0086310 A1 | 4/2010 | Lee et al. |
| 2010/0183268 A1 * | 7/2010 | Kihara et al. ............ 385/93 |
| 2011/0044696 A1 * | 2/2011 | Lim et al. ............... 398/139 |
| 2013/0034357 A1 * | 2/2013 | Lim .................... 398/79 |

FOREIGN PATENT DOCUMENTS

| | | |
|---|---|---|
| JP | 2002-252357 | 9/2002 |
| JP | 2003-279808 A | 10/2003 |
| JP | 2006-345474 A | 12/2006 |
| JP | 2007-057859 A | 3/2007 |
| JP | 2007-85917 | 4/2007 |
| KR | 10-2010-0037741 A | 4/2010 |
| KR | 10-2011-0020578 A | 3/2011 |
| WO | WO 2007/114053 A1 | 10/2007 |

* cited by examiner

FIG. 20

BIDIRECTIONAL OPTICAL TRANSMISSION AND RECEIVING DEVICE

TECHNICAL FIELD

The present invention relates to an optical transmitting and receiving apparatus and, more particularly, to a bi-directional optical transmitting and receiving module capable of performing the transmission and reception of optical signal by using a single optical fiber and a single package, and an optical packaging method therefor.

BACKGROUND ART

A related art bi-directional optical transmitting and receiving apparatus generally has a structure in which a TO-CAN-based optical transmission unit and an optical reception unit are aligned in a single metal housing and fixed by a laser welder, allowing light to be reflected or transmitted by an optical filter mounted within the housing so as to be bi-directionally optically coupled.

When an active optical alignment method using a laser welder is used, two TO-CAN packages can easily be optically aligned, but a large number of components such as the two TO-CAN packages, a metal housing, and the like, may incur a high cost, lead to an increase in processing steps, and significantly degrade mass-producibility.

In an effort to solve the above-detailed problems, a bi-directional optical transmitting and receiving apparatus capable of performing the transmission and reception of optical signal bi-directionally by using a single TO-CAN package has been proposed, but disadvantageously, it has the high possibility of electro-optical crosstalk occurring due to the structure thereof, in which a transmission unit and a reception unit are mounted in the same space within the single TO-CAN package.

Thus, in order to reduce the possibility of the occurrence of electro-optical crosstalk, a method of fabricating a separate lid having a 45-degree sloped surface to isolate the reception unit has been proposed. However, with this method, since an additional lid is provided besides an existing lid, fabrication costs and processing costs are increased, and a hole should be formed in a portion of the 45-degree sloped surface for optical coupling to a reception unit light receiving element. Also, since the size of the hole cannot be reduced structurally, there is a limitation in reducing electro-optical crosstalk, and in case of a WDM (Wavelength Division Multiplexing) filter for diverging input light and output light, only an optical filter manufactured in the form of a thin film on glass should be used and an internal lid having the WDM optical filter should be actively aligned for optical coupling.

Also, in the case of the foregoing related art, a structure manufactured for the respective elements are mounted in a sub-mount form, rather than in the form of a platform, making it difficult to optically align them and increasing process costs and process time. In addition, a long bonding wire and a lead wire are required, having a difficulty in transmitting a high speed signal.

DISCLOSURE

Technical Problem

An aspect of the present invention provides a bi-directional optical transmitting and receiving apparatus capable of minimizing electro-optical crosstalk and maximizing optical coupling efficiency by using a single optical fiber and a single package.

An aspect of the present invention also provides a bi-directional optical transmitting and receiving apparatus in which an optical transmitting and receiving module is packaged according to a passive alignment method and allows for a high speed signal transmission.

Technical Solution

According to an aspect of the present invention, there is provided a bi-directional optical transmitting and receiving apparatus including: a package having a cavity and allowing a plurality of lead wires to pass therethrough; a platform mounted on the package such that the cavity is completely covered, and including a through hole formed above the cavity and having sloped surfaces; a reception unit mounted within the cavity and generating an electrical signal corresponding to input light made incident to the cavity through the through hole and outputting the generated electrical signal to at least one of the plurality of lead wires; a transmission unit mounted on the package such that the transmission unit is placed in a region in which the through hole is not formed, and generating output light according to an electrical signal transmitted through at least one of the plurality of lead wires; and a wavelength division multiplexing (WDM) filter mounted on the platform such that the WDM filter is placed above the through hole to transfer the output light toward an optical fiber and the input light toward the through hole.

The sloped surfaces may reflect the entirety of input light made incident through the through hole toward the cavity.

The bi-directional optical transmitting and receiving apparatus may further include: a spherical or hemispherical lens positioned below the WDM filter to reduce a beam diameter of the input light transferred through the WDM filter.

The platform may further include: an electrode formed across the entire bottom surface of the platform, excluding the through hole, to reduce electrical crosstalk between the reception unit and the transmission unit.

A portion of the plurality of lead wires may be positioned within the cavity.

The bi-directional optical transmitting and receiving apparatus may further include: a focusing lens positioned between the WDM filter and the optical fiber to focus light output from the transmission unit on the optical fiber.

The bi-directional optical transmitting and receiving apparatus may further include: an optical lens positioned between the WDM filter and the light source to reduce a divergence angle of light to allow light to be transferred to the WDM filter.

The bi-directional optical transmitting and receiving apparatus may further include: an optical isolator positioned between the WDM filter and the optical lens to only allow the output light to be transferred to the WDM filter.

The bi-directional optical transmitting and receiving apparatus may further include: a focusing lens positioned between the transmission unit and the WDM filter to focus light output from the transmission unit on the optical fiber.

The bi-directional optical transmitting and receiving apparatus may further include: a collimating lens positioned between the transmission unit and the WDM filter to collimate light output from the transmission unit to the optical fiber.

The bi-directional optical transmitting and receiving apparatus may further include: a focusing lens positioned between the WDM filter and the optical fiber to focus light collimated by the collimating lens on the optical fiber.

The bi-directional optical transmitting and receiving apparatus may further include: an optical isolator positioned between the focusing lens and the WDM filter or between the collimating lens and the WDM filter to only allow light output from the transmission unit to be transferred to the WDM filter.

The platform may further include: a V recess inducing passive alignment of the focusing lens or collimating lens.

The WDM filter may be passively mounted by aligning the center of an active region of a light receiving element of the reception unit and the center of the spherical or hemispherical lens.

The platform may further include: an alignment mark allowing the WDM filter to be passively aligned to be mounted.

Advantageous Effects

In the case of the bi-directional optical transmitting and receiving apparatus according to embodiments of the invention, electro-optical crosstalk is minimized and optical coupling efficiency is maximized by using a single package, and in particular, reception unit alignment tolerance can be considerably enhanced to reduce a defectivity rate of products due to a process error, and the transmission unit and the reception unit can be easily optically aligned simultaneously.

In addition, since the platform including an electrode for transferring an electrical signal of the reception unit and the transmission unit is used, the bonding wire can be minimized in length, and also, since the thin film resistor having excellent high frequency characteristics is used, high speed signal transmission can be made.

Also, since the optical transmitting and receiving module is packaged according to a passive alignment method, process costs and process time can be reduced, obtaining advantages for mass-production.

BEST MODE

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Also, unless explicitly described to the contrary, the word "comprise" and variations such as "comprises" or "comprising," will be understood to imply the inclusion of stated elements but not the exclusion of any other elements.

For reference, in an embodiment of the present invention, a platform is fabricated according to a wet etching method, rather than by a more costly dry etching method, by using a silicon substrate to increase mass-producibility to realize low manufacturing costs. However, a dry etching method may also be used according to an application field and case and any substrate other than a silicon substrate, including a ceramic substrate, may also be used.

Also, a package having a cavity formed on a bottom surface thereof in order to separate a reception unit from a transmission unit is proposed to be used.

Figure 1:
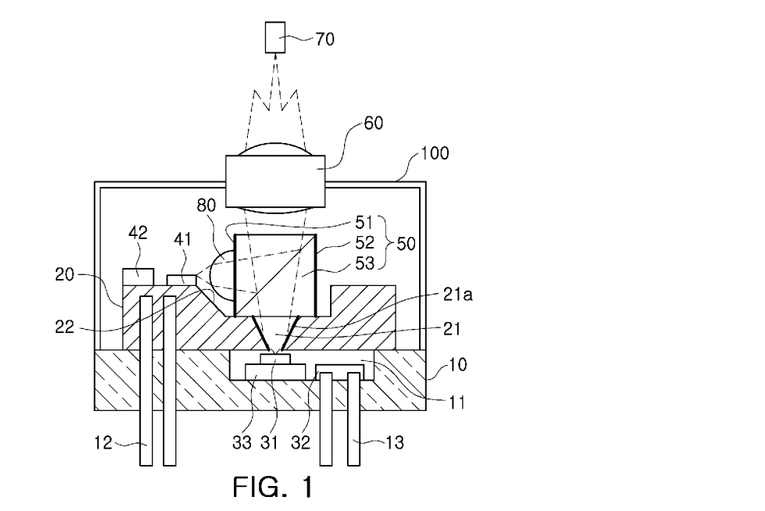
FIGS. 1 through 3 are views illustrating a structure of a bi-directional optical transmitting and receiving apparatus according to an embodiment of the present invention, respectively.
Figure 2:
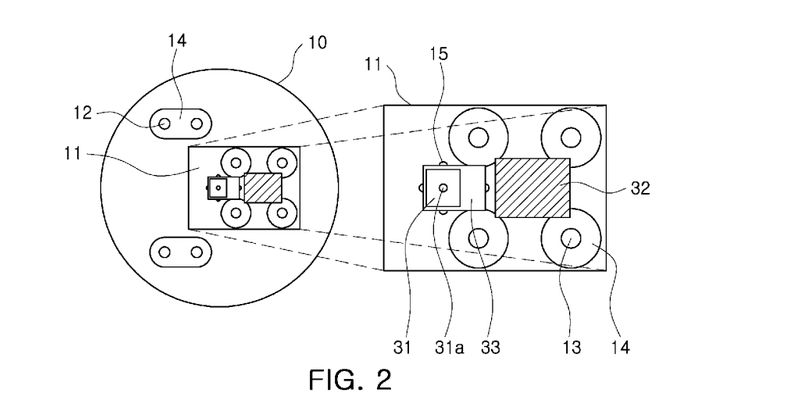
Figure 3:
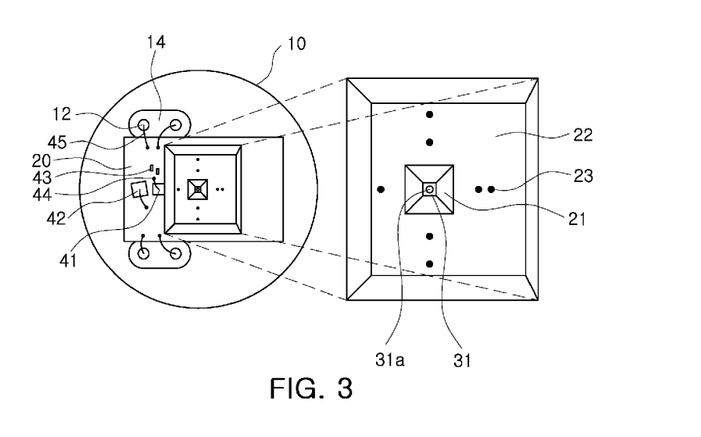

FIGS. 1 through 3 are views illustrating a structure of a bi-directional optical transmitting and receiving apparatus according to an embodiment of the present invention, respectively.

Referring to FIGS. 1 through 3, a bi-directional optical transmitting and receiving apparatus according to an embodiment of the present invention includes a package 10 having a cavity 11, allowing a reception unit to be mounted therein and a plurality of lead wires 12 an 13 to pass therethrough, a platform 20 mounted on the package 10 such that the cavity 11 is completely covered, and having a through hole 21 formed in an upper portion of the cavity 11 and having sloped surfaces, reception units 31 and 32 mounted within the cavity 11 and generating an electrical signal corresponding to input light made incident to the cavity 11 and outputting the generated electrical signal through the lead wire 13, transmission units 41 and 42 mounted on the package 10 such that the transmission units 41 and 42 are placed in a region in which the through hole 21 is not formed, and generating output light according to an electrical signal transmitted through the lead wire 12, a wavelength division multiplexing (WDM) filter 50 mounted on the platform 20 such that the WDM filter 50 is placed above the through hole 21 and transferring output light toward an optical fiber 70 and transferring input light toward the through hole 21, a focusing lens 60 positioned between the optical fiber 70 and the WDM filter 50 to focus output light transferred through the WDM filter 50 on the optical fiber 70 to increase optical transmission efficiency, and a lid 100 hermetically sealing an upper space of the package 10 and the platform 20 and fixing the focusing lens 60 such that the focusing lens 60 is placed above the WDM filter 50.

Preferably, a portion of the lead wire 13 is formed within the cavity 11 of the package in order to reduce electrical crosstalk between the transmission units and the reception units.

The reception units 31 and 32 may include a reception unit light receiving element 31 mounted within the cavity 11 such that it is placed below the through hole 21, and generating an electrical signal corresponding to input light made incident to the cavity 11 through the through hole 21, and a trans-impedance amplifier 32 mounted within the cavity 11, amplifying an output from the reception unit light receiving element 31, and converting a current signal into a voltage signal and outputting the converted voltage signal through the lead wire 13. Here, the trans-impedance amplifier 32 may include a limiting amplifier as necessary.

Also, the reception units 31 and 32 may further include a sub-mount 33 for the reception unit light receiving element 31, a capacitor 33 for reducing noise in a power source terminal, and the like. In addition, as illustrated in FIG. 2, the reception unit light receiving element 31 may be mounted based on an alignment mark 15 for a passive alignment of a light receiving element formed on the platform 20, thus enhancing optical reception efficiency.

The transmission units 41 and 42 may include a light source 41 mounted on the platform 20 such that it is disposed horizontally with regard to the WDM filter 50, and generating output light in response to an electrical signal supplied through the lead wire 12, and a monitoring light receiving element 42 mounted on the platform 20 such that it is adjacent to the light source 41, monitoring output strength of the light source 41, and outputting monitoring results through the lead wire 12. Also, the transmission units 41 and 42 may further include a thin film resistor 43 for impedance matching with a light source driving circuit (not shown) and the optical source 41, and the like.

The platform 20 is mounted on the package 10. In particular, preferably, the platform 20 is mounted on the package 10 such that the cavity 11 is completely covered in order to reduce electro-optical crosstalk. Also, as illustrated in FIG. 3, preferably, the platform 20 is mounted such that the center of the through hole 21 formed in the platform 20 and the center of an active region of the reception unit 31 correspond to each other, in order to maximize a passive optical alignment and optical alignment efficiency.

Also, in order to minimize electro-optical crosstalk between the reception units 31 and 32 and the transmission units 41 and 42, preferably, an electrode 44 is formed across the entire bottom surface of the platform 20. Accordingly, electrical crosstalk through a substrate can be effectively blocked.

In addition, an insulator 14 may be formed to cover the lead wires 12 and 13 to insulate the platform 20 and the lead wires 12 and 13 and perform impedance matching, and the alignment mark 15 may be formed to induce a passive alignment of the reception unit light receiving element 31.

The focusing lens 60 may be implemented with various lenses, such as a spherical lens, a hemispherical lens, or the like, and may be replaced by various lenses such as a collimating lens, or the like.

If a light source 41 having a wide divergence angle is used, a diameter of a beam of output light in a front stage of the focusing lens 60 may be so large that it would not be easy to design and manufacture the focusing lens 60 or a diameter of a beam of output light is increased to be greater than the size of the WDM filter 50 to cause a loss. In order to solve this problem, an optical lens 80 serving to reduce the divergence angle of the light source 41 may be positioned between the WDM filter 50 and the light source 41.

Figure 11:
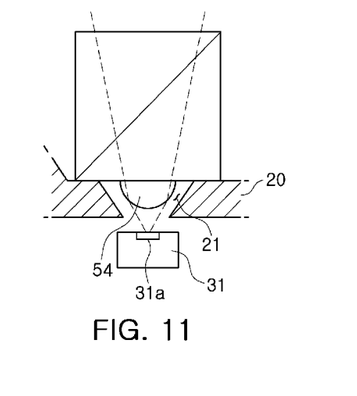
Figure 12:
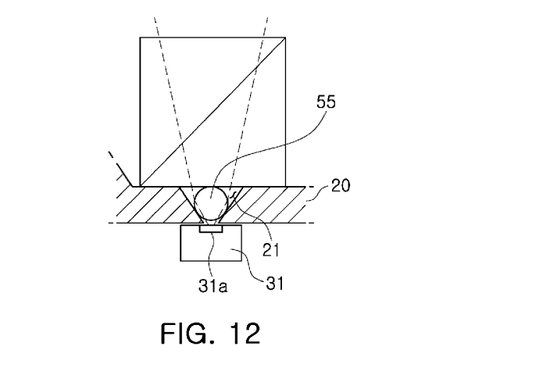

Besides, as illustrated in FIGS. 11 and 12, in order to reduce a focal length of the reception unit light receiving element 31 or effectively focus input light, a hemispherical lens 54 may be attached to a lower portion of the WDM filter 50 or a spherical lens 55 may be mounted in the through hole 21 having sloped surfaces of the platform 20.

As the WDM filter 50, various types of WDM filters, beam splitters, or the like, may be used. Preferably, as illustrated in FIG. 1, the hexahedral WDM filter including the two prisms 51 and 52 and the thin film filter 53 formed between the two prisms 51 and 52 is used.

Figure 4:
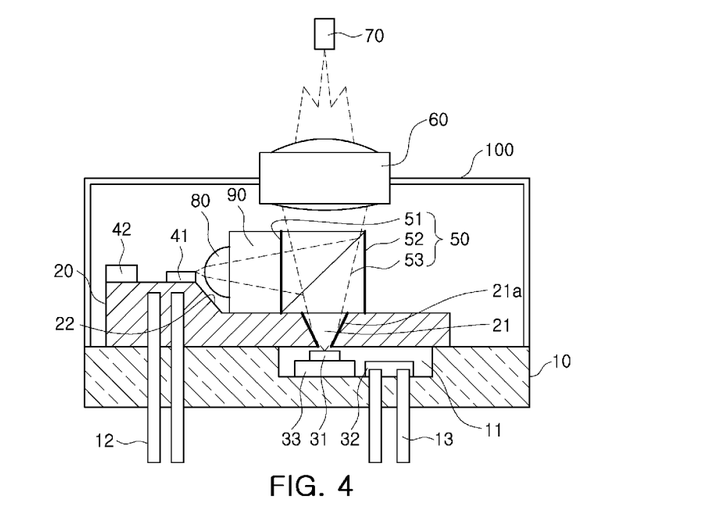
FIGS. 4 and 5 are views illustrating a structure of a bi-directional optical transmitting and receiving apparatus according to another embodiment of the present invention, respectively.

In addition, as illustrated in FIG. 4, the bi-directional optical transmitting and receiving apparatus may further include an optical isolator 90 formed between the light source 41 and the WDM filter 50 allowing only light output from the light source 41 to be transferred to the WDM filter 50. In such a case, preferably, the optical isolator 90 is attached to the WDM filter 50 and the optical isolator 90 and the WDM filter 50 are subsequently mounted together on the platform 20.

As illustrated in FIG. 4, when the optical isolator 90 is added, a distance between the light source 41 and the focusing lens 60 may be lengthened in comparison to the case of FIG. 1, and accordingly, a distance between the reception unit light receiving element 31 and the WDM filter 50 may be lengthened to degrade coupling efficiency. Here, if the cavity 11 is formed to be deeper in order to compensate for this problem, it may be difficult to manufacture the corresponding structure and manufacturing costs may be increased. However, in an embodiment of the present invention, input light is reflected by using the sloped surfaces formed in the platform 20 so as to be entirely transferred to the reception unit light receiving element 31, thus solving the problem.

Figure 5:
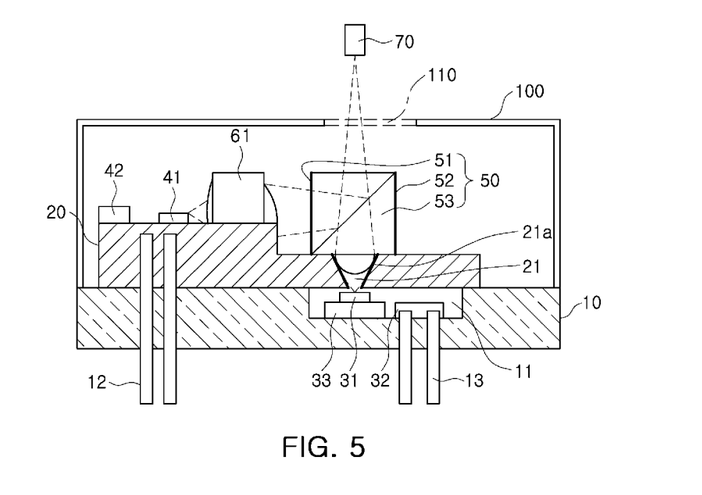

Also, as illustrated in FIG. 5, in the bi-directional optical transmitting and receiving apparatus, a focusing lens 61 may be mounted on the platform 20 such that it is placed between the light source 41 and the WDM filter 50, rather than on an upper side of the WDM filter 50. In this case, there is no need to mount the focusing lens 61 on the lid 100, allowing for the use of a low-priced flat window lid, and since the focusing lens 61 is mounted on an inner surface of the lid 100, the lens may be free from contamination, enhancing reliability.

Also, the bi-directional optical transmitting and receiving apparatus may use a collimating lens for collimating light output from the light source 41, instead of the focusing lens 61, and in this case, a focusing lens for focusing collimated light on the optical fiber 70 may be further provided between the WDM filter 50 and the optical fiber 70.

Figure 6:
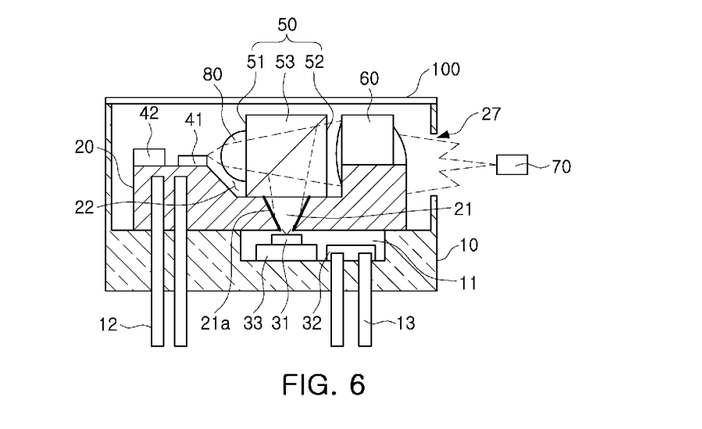
FIGS. 6 and 7 are views illustrating a structure of a bi-directional optical transmitting and receiving apparatus according to another embodiment of the present invention, respectively.
Figure 7:
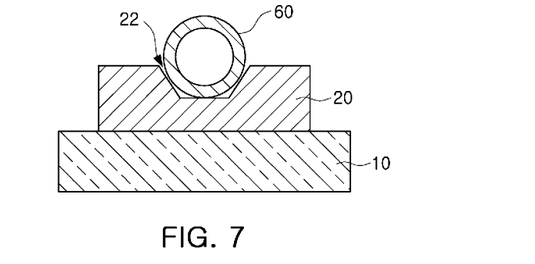

FIGS. 6 and 7 are views illustrating a structure of a bi-directional optical transmitting and receiving apparatus according to another embodiment of the present invention, respectively.

In the bi-directional optical transmitting and receiving apparatus illustrated in FIG. 6, the optical fiber 70 is placed in a direction horizontal to the WDM filter 50, and the focusing lens 60 is mounted on the platform 20 such that it is placed between the WDM filter 50 and the optical fiber 70. Namely, the bi-directional optical transmitting and receiving apparatus illustrated in FIG. 6 relates to another example in which the optical fiber 70 is positioned in a direction horizontal to the WDM filter 50, rather than in an upper side of the WDM filter 50.

In this case, the package 10 has a cylindrical shape with a bottom surface thereof stopped up and a top surface thereof opened, and includes a window 27 for transferring light output from the transmission unit light source 41 to the optical fiber 70. The lid 100 is implemented in the form of a plate that may be fastened to an upper surface of the package 10 to hermetically seal the upper space of the package 10 and the platform 20. As illustrated in FIG. 7, advantageously, a V-shaped recess 26 may be formed in the platform 20, and the focusing lens 61 may be mounted in the platform 20 according to a passive alignment method.

FIGS. 8 through 12 are views illustrating optical coupling structures proposed to maximize optical coupling efficiency according to an embodiment of the present invention.

Figure 8:
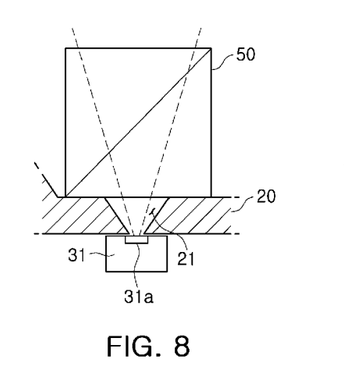
FIGS. 8 through 12 are views illustrating optical coupling structures proposed to maximize optical coupling efficiency according to an embodiment of the present invention.

FIG. 8 illustrates a case in which a beam diameter of input light transmitted through the WDM filter 50 in front of the active region 31a is smaller than an active region 31a of the reception unit light receiving element 31, thus obtaining high coupling efficiency.

Figure 9:
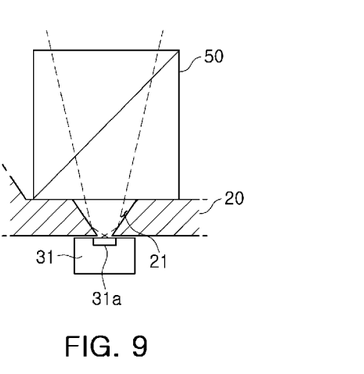

FIG. 9 illustrates a case in which a beam diameter of input light transmitted through the WDM filter 50 in front of the active region 31a is greater than the active region 31a. However, even in this case, it can be seen that input light is reflected from the sloped surfaces of the through hole 21 of the platform 20 so as to be coupled to the active region 31a of the reception unit light receiving element 31.

Figure 10:
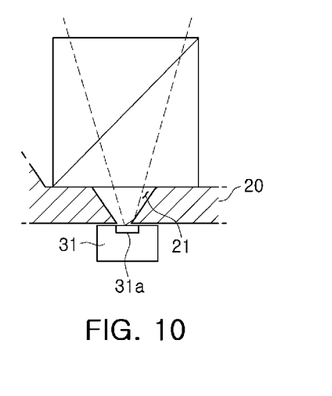

FIG. 10 illustrates a case in which the active region 31a of the reception unit light receiving element 31, upon being mounted on the platform 20, is inclined to one side of the through hole 21 of the platform 20 or a case in which optical axis of input light is made incident to be inclined to one side of the through hole 21 of the platform 20. Even in this case, light is reflected from the sloped surfaces of the though hole 21 of the platform 20 so as to be coupled to the active region 31a of the reception unit light receiving element 31.

FIGS. 11 and 12 illustrate an optical coupling method in a case of installing the hemispherical lens 54 or spherical lens 55 to enhance optical coupling efficiency.

In this manner, the bi-directional optical transmitting and receiving apparatus has a structure maximizing optical coupling efficiency, achieving an effect of reducing a defectivity rate due to a process error generated during a mass-production process.

For example, when the distance between the light source 41 and the WDM filter 50 or the distance between the light source 41 and the optical lens 80 provided between the light source 41 and the WDM filter 50 is changed due to a process error, the distance between the focusing lens 60 and the optical fiber 70 is changed, to thereby degrade coupling efficiency, which causes the focal length of input light passing through the focusing lens 60 to be lengthened to drastically degrade coupling efficiency.

However, in an embodiment of the present invention, the sloped surfaces of the through hole 21 of the platform serves as a lens to cancel out the degradation of coupling efficiency to a degree. As a result, an effect of increasing alignment tolerance is achieved.

In general, a bi-directional optical transmitting and receiving apparatus using a single package has a difficulty in optically aligning both a transmission unit and a reception unit, unlike an optical transmitting apparatus or an optical receiving apparatus. However, as described above, in the bi-directional optical transmitting and receiving apparatus according to an embodiment of the present invention, the reception unit has great alignment tolerance, and thus, simultaneous bi-directional optical alignment can be made according to a method of aligning only the transmission unit by using the conventional laser welder.

FIGS. 13 through 18 are views illustrating a process of manufacturing a bi-directional optical transmitting and receiving apparatus according to an embodiment of the present invention, which depict an example of using a TO-CAN package which are most preferably used in the industrial fields so far.

Figure 13:
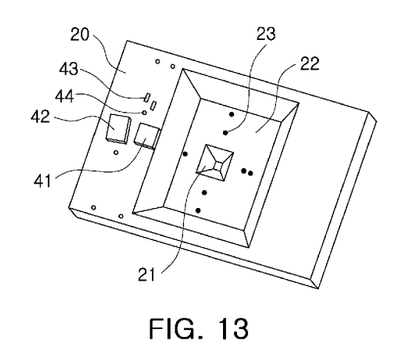
FIGS. 13 through 18 are views illustrating a process of manufacturing a bi-directional optical transmitting and receiving apparatus according to an embodiment of the present invention.

As illustrated in FIG. 13, the platform 20 including the through hole 21 for optical coupling of the reception unit, the cavity 22 allowing the WDM filter 50 to be mounted therein, and the alignment mark 24 for passive alignment of a filter is prepared, and the light source 41, the monitoring light receiving element 42, the thin film resistor 43, and the like, are mounted on the platform 20 such that they are placed in a region in which the cavity 22 is not formed.

Figure 14:
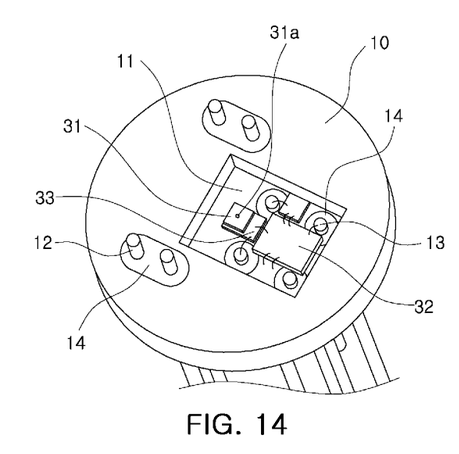

Also, as illustrated in FIG. 14, the package including a cavity 11 for allowing a reception unit to be mounted therein is prepared, and the reception unit light receiving element 31, the trans-impedance amplifier 32, the sub-mount or capacitor 33, and the like, are mounted in the cavity 11.

Figure 15:
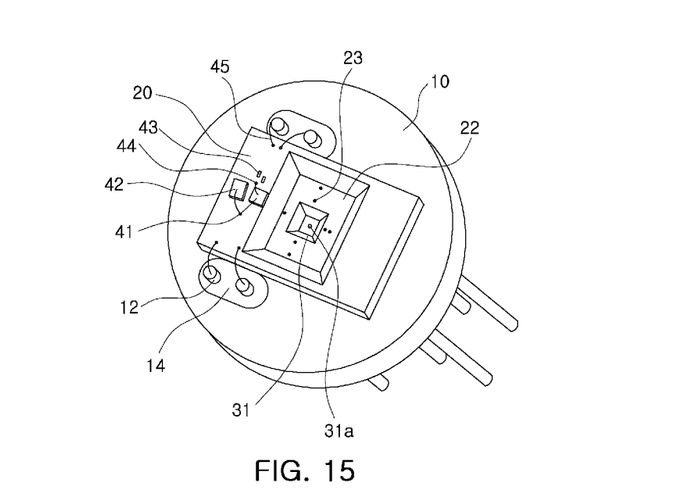

Subsequently, as illustrated in FIG. 15, the platform 20 is mounted on the package 10 such that the active region 31a of the reception unit light receiving element 31 is placed in the center of the through hole 21 of the platform 20.

Figure 16:
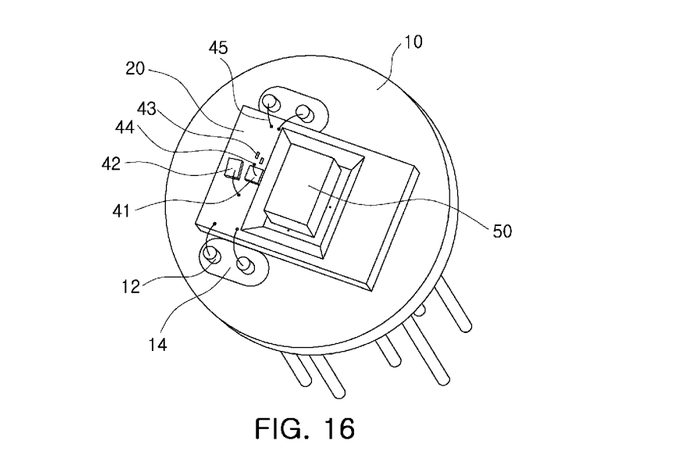

Subsequently, as illustrated in FIG. 16, the WDM filter 50 is mounted on the platform 20 such that a central point of a lower surface of the WDM filter 50 comes to the center of the through hole 21 of the platform 20. Here, preferably, the WDM filter 50 is mounted according to a passive alignment method by using the alignment mark 24 formed on the platform 20. However, when higher coupling efficiency is intended to be obtained, the WDM filter 50 may be mounted by applying power to the reception unit and the transmission unit and subsequently monitoring a photo current of the reception unit and optical power of an output from the transmission unit according to an active alignment method. Alternatively, the active region 31a of the reception unit light receiving element 31 transmitted to the WDM filter 50 and an active region of the transmission unit light source 41 projected to a sloped surface of the WDM filter 50 may be passively aligned in an overlapping manner in the upper side of the package 10.

Since the hemispherical lens is mounted in the center of a lower surface of the WDM filter 50 and the center of the hemispherical lens and the center of the active region of the reception unit light receiving element are adjusted to correspond to each other through passive alignment, whereby passive alignment is available to allow for a mass-production. In particular, when the passive alignment method is employed, the distance between the hemispherical lens and the reception unit light receiving element should be minimized to enhance optical coupling efficiency. In the bi-directional optical transmitting and receiving module according to an embodiment of the present invention, the distance between the hemispherical lens and the reception unit light receiving element is reduced to be as short as tens of microns, maximizing optical coupling efficiency.

In addition, in the case of passively aligning the WDM filter 50, preferably, the alignment mark 23 is formed on the platform 20 to allow the WDM filter 50 to be mounted at a right angle, as closely as possible, with respect to an optical axis.

In the related art bi-directional optical transmitting and receiving apparatus, the lead wires and the reception unit and the transmission unit are directly connected through bonding wires, but in the present embodiment, as illustrated in FIG. 16, the electrode formed on the platform is utilized and the bonding wire 25 is only used to connect the lead wire and the electrode, so the length of the bonding wire 25 is minimized. Also, a high speed signal transmission can be made by using the thin film resistor 43 having excellent high frequency characteristics.

Figure 17:
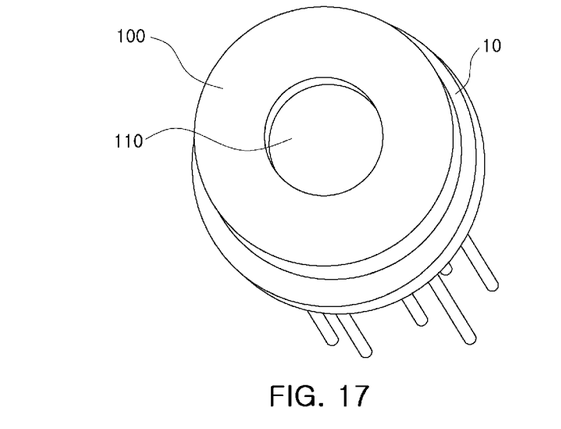
Figure 18:
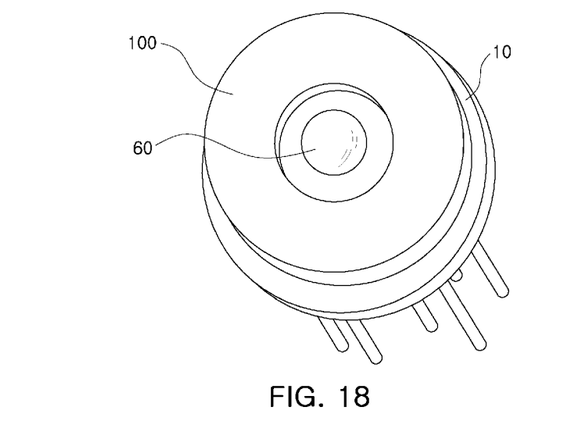

Thereafter, as illustrated in FIGS. 17 and 18, the lid 100 having a transparent window 120 or the lid 100 with the focusing lens mounted thereon are mounted on the package 10 to hermetically seal the upper space of the package 10 and the platform 20.

Figure 19:
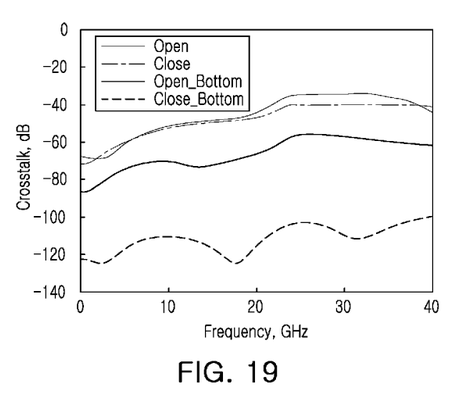
FIG. 19 is a graph showing the results of interpreting a degree of electrical crosstalk between a transmission unit and a reception unit of the bi-directional optical transmitting and receiving apparatus according to an embodiment of the present invention.

FIG. 19 is a graph showing the results of interpreting a degree of electrical crosstalk between the transmission unit and the reception unit of the bi-directional optical transmitting and receiving apparatus according to an embodiment of the present invention.

In FIG. 19, 'Open' indicates results of interpreting electrical crosstalk between the transmission unit and the reception unit caused when the platform 20 did not completely cover the cavity 11 formed in the package 10 and no electrode was formed on the bottom surface of the platform 20. 'Close' indicates results of interpreting electrical crosstalk between the transmission unit and the reception unit caused when the platform 20 completely covered the cavity 11 formed in the package 10 and no electrode was formed on the bottom surface of the platform 20. 'Open_Bottom' indicates results of interpreting electrical crosstalk between the transmission unit and the reception unit caused when the platform 20 did not completely cover the cavity 11 formed in the package 10 and an electrode was formed across the entire bottom surface of the platform 20, excluding the through hole. 'Close_Bottom' indicates results of interpreting electrical crosstalk between the transmission unit and the reception unit caused when the platform 20 completely covered the cavity 11 formed in the package 10 and an electrode was formed across the entire bottom surface of the platform 20, excluding the through hole.

With reference to 'Close_Bottom' of FIG. 19, it can be seen that electrical crosstalk, one of the biggest problems of the bi-directional optical transmitting and receiving apparatus, can be drastically reduced to below 100 dB when the platform 20 completely covers the cavity 11 of the package 10 and an electrode is formed across the entire bottom surface of the platform 20, excluding the through hole 21.

Figure 20:
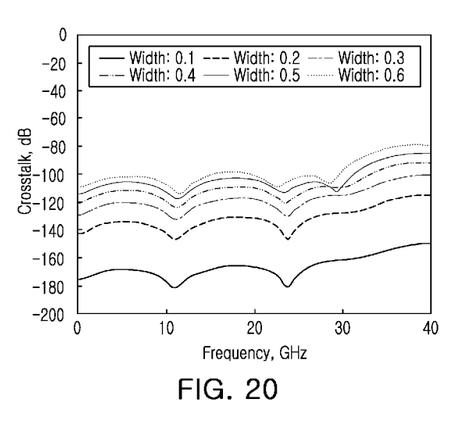
FIG. 20 is a graph showing the results of interpreting electrical crosstalk according to a width of a bottom surface of a through hole formed in a platform and having a sloped surface according to an embodiment of the present invention.

FIG. 20 is a graph showing the results of interpreting electrical crosstalk in the case of 'Close_Bottom' according to a width of a bottom surface of the through hole formed in the platform and having sloped surfaces according to an embodiment of the present invention.

It can be seen that electrical crosstalk is reduced as the width of the bottom surface of the through hole 21 is reduced. Namely, in the case of the platform 20 having the through hole 21 with the sloped surfaces formed therein, the size of the through hole on the bottom surface of the platform 20 can be reduced, owing to the sloped surfaces, further reducing electrical crosstalk, and optical crosstalk, as well as electrical crosstalk, can be remarkably reduced based on a similar principle.

The invention claimed is:

1. A bi-directional optical transmitting and receiving apparatus comprising:
    a package having a cavity and allowing a plurality of lead wires to pass therethrough;
    a platform mounted on the package such that the cavity is completely covered, and including a through hole formed above the cavity and having sloped surfaces;
    a reception unit mounted within the cavity and generating an electrical signal corresponding to input light made incident to the cavity through the through hole and outputting the generated electrical signal to at least one of the plurality of lead wires;
    a transmission unit mounted on the platform such that the transmission unit is placed in a region in which the through hole is not formed, and generating output light according to an electrical signal transmitted through at least one of the plurality of lead wires; and
    a wavelength division multiplexing (WDM) filter mounted on the platform such that the WDM filter is placed above the through hole to transfer the output light toward an optical fiber and the input light toward the through hole,
    wherein a portion of the plurality of lead wires is positioned within the cavity.

2. The bi-directional optical transmitting and receiving apparatus of claim 1, wherein the sloped surfaces reflect the entirety of input light made incident through the through hole toward the cavity.

3. The bi-directional optical transmitting and receiving apparatus of claim 1, further comprising a spherical or hemispherical lens positioned below the WDM filter to reduce a beam diameter of the input light transferred through the WDM filter.

4. The bi-directional optical transmitting and receiving apparatus of claim 3, wherein the WDM filter is passively mounted by aligning the center of an active region of a light receiving element of the reception unit and the center of the spherical or hemispherical lens.

5. The bi-directional optical transmitting and receiving apparatus of claim 4, wherein the platform further comprises an alignment mark allowing the WDM filter to be passively aligned to be mounted.

6. The bi-directional optical transmitting and receiving apparatus of claim 1, further comprising a focusing lens positioned between the WDM filter and the optical fiber to focus light output from the transmission unit on the optical fiber.

7. The bi-directional optical transmitting and receiving apparatus of claim 6, wherein the platform further comprises a V recess inducing passive alignment of the focusing lens.

8. The bi-directional optical transmitting and receiving apparatus of claim 1, further comprising an optical lens positioned between the WDM filter and the light source to reduce a divergence angle of light to allow light to be transferred to the WDM filter.

9. The bi-directional optical transmitting and receiving apparatus of claim 8, further comprising an optical isolator positioned between the WDM filter and the optical lens to only allow the output light to be transferred to the WDM filter.

10. The bi-directional optical transmitting and receiving apparatus of claim 1, further comprising a focusing lens positioned between the transmission unit and the WDM filter to focus light output from the transmission unit on the optical fiber.

11. The bi-directional optical transmitting and receiving apparatus of claim 10, further comprising an optical isolator positioned between the focusing lens and the WDM filter to only allow light output from the transmission unit to be transferred to the WDM filter.

12. The bi-directional optical transmitting and receiving apparatus of claim 10, wherein the platform further comprises a V recess inducing passive alignment of the focusing lens.

13. The bi-directional optical transmitting and receiving apparatus of claim 1, further comprising a collimating lens positioned between the transmission unit and the WDM filter to collimate light output from the transmission unit to the optical fiber.

14. The bi-directional optical transmitting and receiving apparatus of claim 13, further comprising: a focusing lens positioned between the WDM filter and the optical fiber to focus light collimated by the collimating lens on the optical fiber.

15. The bi-directional optical transmitting and receiving apparatus of claim 14, wherein the platform further comprises a V recess inducing passive alignment of the focusing lens or collimating lens.

16. The bi-directional optical transmitting and receiving apparatus of claim 13, further comprising an optical isolator positioned between the collimating lens and the WDM filter to only allow light output from the transmission unit to be transferred to the WDM filter.

17. The bi-directional optical transmitting and receiving apparatus of claim 13, wherein the platform further comprises a V recess inducing passive alignment of the collimating lens.

18. A bi-directional optical transmitting and receiving apparatus comprising:
- a package having a cavity and allowing a plurality of lead wires to pass therethrough;
- a platform mounted on the package such that the cavity is completely covered, and including a through hole formed above the cavity and having sloped surfaces;
- a reception unit mounted within the cavity and generating an electrical signal corresponding to input light made incident to the cavity through the through hole and outputting the generated electrical signal to at least one of the plurality of lead wires;
- a transmission unit mounted on the platform such that the transmission unit is placed in a region in which the through hole is not formed, and generating output light according to an electrical signal transmitted through at least one of the plurality of lead wires; and
- a wavelength division multiplexing (WDM) filter mounted on the platform such that the WDM filter is placed above the through hole to transfer the output light toward an optical fiber and the input light toward the through hole,
- wherein the platform further comprises an electrode formed across the entire bottom surface of the platform, excluding the through hole, to reduce electrical crosstalk between the reception unit and the transmission unit.

19. The bi-directional optical transmitting and receiving apparatus comprising:
- a package having a cavity and allowing a plurality of lead wires to pass therethrough;
- a platform mounted on the package to cover the cavity, the platform having a closed loop shape including a through hole which is formed above the cavity and has sloped surfaces, wherein, when taken from a plan view, the entire through hole is embedded within an outer periphery of the cavity;
- a reception unit mounted within the cavity and generating an electrical signal corresponding to input light made incident to the cavity through the through hole and outputting the generating electrical signal to at least one of the plurality of lead wires;
- a transmission unit mounted on the platform such that the transmission unit is placed in a region in which the through hole is not formed, and generating output light according to an electrical signal transmitted through at least one of the plurality of lead wires, and
- a wavelength division multiplexing (WDM) filter mounted on the platform such that the WDM filter is placed above the through hole to transfer the output light toward an optical fiber and the input light toward the through hole.

* * * * *